United States Patent

Balz et al.

[11] Patent Number: 5,929,865
[45] Date of Patent: Jul. 27, 1999

[54] METHOD OF SORTING TWO-DIMENSIONAL GRAPHIC IMAGES FOR CONVERTING INTO RASTER LINES

[75] Inventors: James G. Balz, Maybrook; Mark W. Kapfhammer, Fishkill; Mark J. LaPlante, Walden; David C. Long, Wappingers Falls, all of N.Y.

[73] Assignee: International Business Machines Corporation, Armonk, N.Y.

[21] Appl. No.: 08/663,828

[22] Filed: Jun. 14, 1996

[51] Int. Cl.⁶ ........................................ G06T 11/00
[52] U.S. Cl. ................................. 345/441; 345/433
[58] Field of Search .................... 345/440, 441, 345/442, 443, 421, 422, 433, 434, 435, 113, 118, 135

[56] References Cited

U.S. PATENT DOCUMENTS

| 5,040,130 | 8/1991 | Chang et al. | 345/434 |
|---|---|---|---|
| 5,077,679 | 12/1991 | Williamson et al. | 395/105 |
| 5,304,988 | 4/1994 | Seto | 345/141 |
| 5,488,692 | 1/1996 | Karasick et al. | 345/420 |
| 5,509,110 | 4/1996 | Latham | 345/421 |

OTHER PUBLICATIONS

Foley et al., *Computer Graphics: Principles and Practice*, Second Edition, 1993, pp. 82–83 and 680–686.

*Primary Examiner*—Stephen S. Hong
*Attorney, Agent, or Firm*—DeLio & Peterson, LLC; Peter W. Peterson; Aziz M. Ahsan

[57] ABSTRACT

A method for sorting two-dimensional graphics data into raster lines is described. The method decomposes the graphic images into vector line and arc segments with their associated two-dimensional coordinates. A vector or sub-shape list is then established containing the coordinates of all the vector lines and arcs. Sorting is then performed on the vector data by organizing each vector based upon its X- or Y- coordinate information. Pixels that make up each sub-shape are then computed. This computation is performed for each sub-shape in the order given by the sorted, sub-shape list. The resultant pixel list is ordered according to the X- or Y- dimensional sort previously performed. Pixels generated in a partially pre-sorted arrangement are arranged in a pixel array. The stored pixel array is then used to form raster lines.

10 Claims, 2 Drawing Sheets

5,929,865

METHOD OF SORTING TWO-DIMENSIONAL GRAPHIC IMAGES FOR CONVERTING INTO RASTER LINES

BACKGROUND OF THE INVENTION

1. Field of the Invention

The present invention relates generally to a method for converting graphics data into raster lines.

2. Problem to be Solved

A pixel is a single point in a graphics image. Pixel data is used by many computer hardware and software systems to display graphic images on monitors, display screens, CRTs etc. Pixel data is also used to program the operations of automated manufacturing equipment such as data-driven micro-machining devices. In such an application, pixel data defines the precise location where the laser is to be aimed. The precise location is based on design data that is converted into the pixel data.

In practically all graphics systems, converting design data into pixel data requires the step of sorting the pixel data into raster lines. Conventional methods of sorting the pixel data into raster lines are time consuming and significantly degrade production yield in a manufacturing environment when automated manufacturing equipment depends upon the conversion of such data. What is needed is a new and improved method for sorting pixel data into raster lines that is time efficient.

It is therefore an object of the present invention to provide a new method for converting graphics data into raster lines.

It is another object of the present invention to provide a new method for converting graphics data into raster lines that is time efficient.

A further object of the invention is to provide a new method for converting graphics data into raster lines that is able to effect sorting pixels into raster lines in less time than conventional methods.

It is yet another object of the present invention to provide a method for converting graphics data into raster lines that can be used with automated manufacturing machinery.

Still other objects and advantages of the invention will in part be obvious and will in part be apparent from the specification.

SUMMARY OF THE INVENTION

The above and other objects and advantages, which will be apparent to one skilled in the art, are achieved in the present invention which is directed to, in a first aspect, a method for processing data that includes the following steps: providing input data defining shapes in a two-dimensional plane, wherein the shapes are defined by points with a plurality of coordinates on an X-axis and a Y-axis; decomposing the data defining each shape into two-dimensional vector data wherein the vectors are defined by points with a plurality of coordinates on an X-axis and a plurality of coordinates on a Y-axis, sorting the two-dimensional vector data according to a first predetermined order according to the defined X-axis coordinates or the defined Y-axis coordinates; and, thereafter determining pixel data for the vector data, the pixel data being in substantially the same order as the sorted vector data.

The pixel data is then further sorted according to a second predetermined order. This method may further include, in a second aspect, the step of forming raster lines from the sorted pixel data. The shape data may be in the form of a polygon or circle, that is then decomposed into vector data. The pixel data is stored in a storage medium. In a third aspect, a machine device is then moved according to the developed raster lines.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–2 of the drawings in which like numerals refer to like features of the invention.

Figure 1:
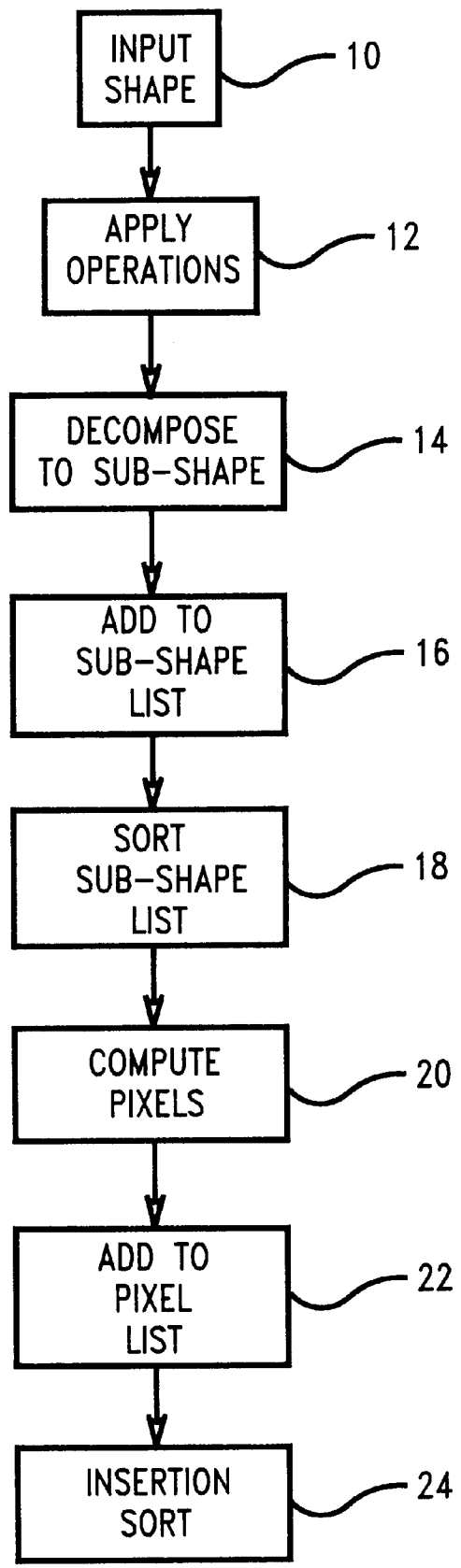
FIG. 1 is a flow diagram of the method of the present invention.
Figure 2:
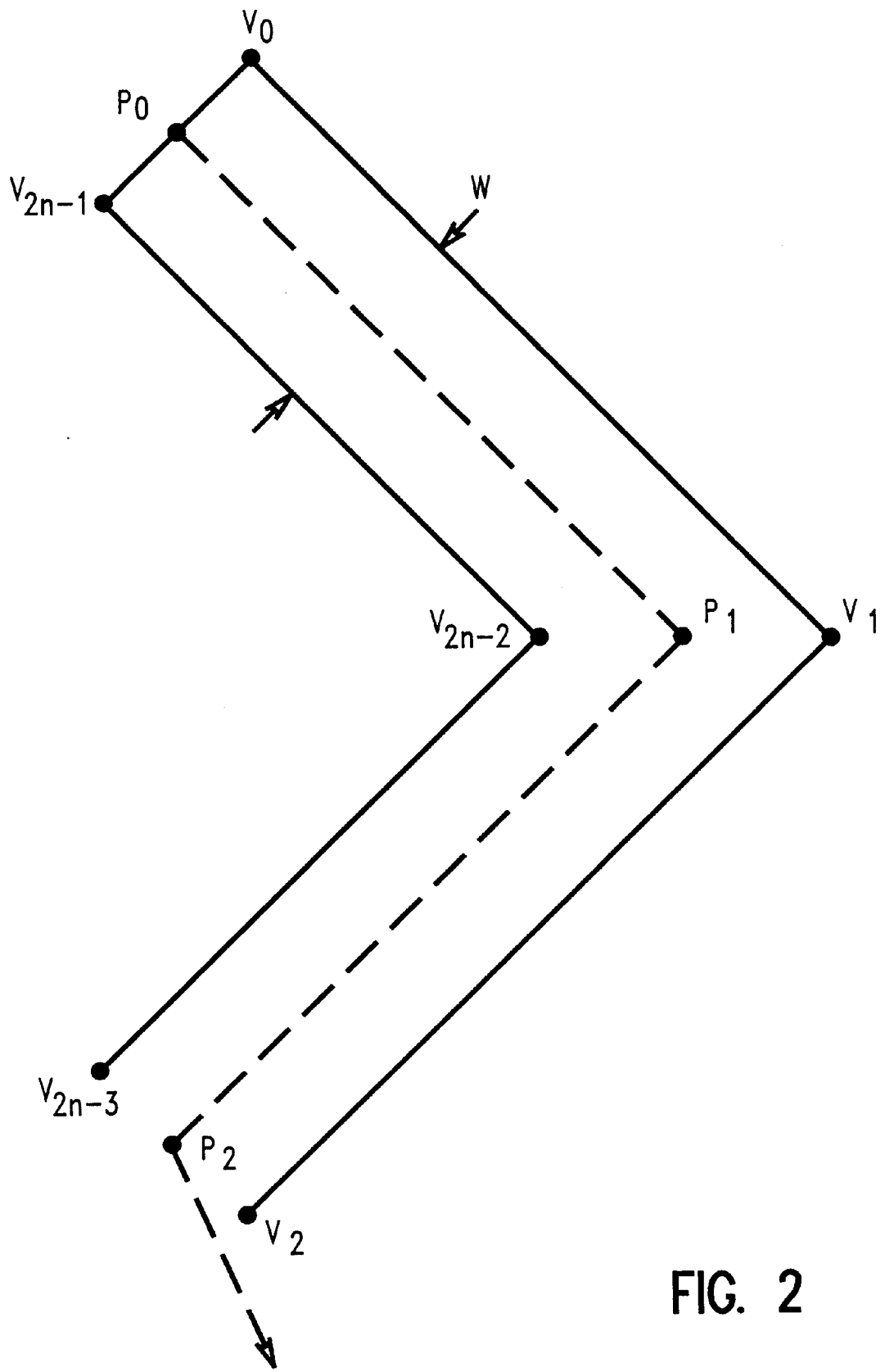
FIG. 2 illustrates the manner in which line segments are represented by the method of the present invention.

FIG. 1 is a flow diagram illustrating the steps of the method of the present invention. The method starts at step 10 which effects the input of design or graphics data and operation data. For example, the design or graphics data defines specific shapes or patterns, e.g. circle, polygons, squares, rectangles, etc. with respect to an X-Y grid. For example, in the case of a circle, the design data consist of the X-Y coordinates of the center of the circle and the radius of the circle. The operation data defines any operations that are to be performed on the design or graphics data. Typically, the design data consist of CAD (computer-aided-design) design data and may be in any one of the known formats thereby allowing the combination of more than one dataset. Such combinations are routinely used to add alignment marks and other features not present in the original design. The design or graphics data is typically stored in a storage device or medium such as a RAM (random access memory) or other mass storage devices such as magnetic disks.

After step 10 is completed, step 12 effects the implementation of any specified operations on the design data. Such operations include, but are not limited to, reflection, rotation, translation, step-and-repeat and magnification. Magnification can lead to an expansion of the pattern when the magnification is greater than one (1). The pattern can be contracted if the magnification is between zero (0) and one (1). If the magnification is less than zero (0), the pattern is inverted. The operation data determines what types of operations are to be performed on the shapes. The specific operations are performed only on vectors that form the shapes. The operations of step 10 may be implemented with a digital computer.

Step 14 then decomposes all shapes into vectors or sub-shapes such as line segments or arcs. For example, a circle is decomposed into a group of arcs and a polygon is decomposed into a group of line segments. FIG. 2 illustrates line segments represented in a micro-electronics device design format. One line segment is defined by points $P_0$ and $P_1$ which are defined by specific X, Y coordinates. Another line segment is defined by points $P_1$ and $P_2$ which are also defined by specific X, Y coordinates. The design data represents each line segment as having a width W. The width W is defined by the distance between reference line segments on either side of line segments $P_0$, $P_1$ and $P_1$, $P_2$. The reference line segments are defined by points $(V_0, V_1)$, $(V_1, V_2)$, $(V_{2n-1}, V_{2n-2})$ and $(V_{2n-2}, V_{2n-3})$. The method of the present invention processes a line segment having a finite width as a polygon and processes a polygon as a sequence of line segments. The coordinates or points of each line segment and arc are then stored in a storage medium.

Step 16 effects adding the coordinates or points of the line segments and arcs into a list to form a vector or sub-shape list which contains the coordinates of all vectors or sub-shapes, e.g. line segments and arcs. The list can be realized by a portion of memory in the storage medium.

Step 18 effects sorting the coordinates of the arcs and line segments by the coordinate position of the line segments and arcs. Step 18 may be implemented with any one of the known sorting methods. At this point, the list is short since it contains only vectors. Thus, the efficiency of the sorting method is not critical. Specifically, step 18 effects ordering the points in the list according to a predetermined order. For example, the points may be arranged in descending order wherein the point in the first position has the highest "Y" coordinate and the point in the last position in the list has the lowest "Y" coordinate. In another example, the points may be arranged in an order based on the "X" coordinate position wherein the point having the highest "X" coordinate is placed first or at the top of the list and the point having the lowest "X" coordinate is last in the list. Since there are only a few elements, e.g. line segments, arcs, etc. that describe the design at this point in the method and since the pixels have not yet been computed, step 18 is implemented in a relatively short amount of time. For example, translating a circle prior to pixel computations can be accomplished simply be adding an offset to the center. However, if all the pixels have already been computed, then each pixel will require an offset. Thus, step 18 effects sorting of data while still in vector form thereby avoiding the complexities of having to sort the data in pixel form.

Step 20 effects determination or computation of the pixels that make up the sub-shapes, i.e. line segments, arcs in the list created by step 18. The pixels for single, isolated shapes are computed in a pre-sorted order. A knowledge of the shape geometry allows one to compute the pixels in the correct (i.e., sorted) order without need for any subsequent, distinct sorting step. Once computed, the pixels for each sub-shape are appended to a list of pixels derived from the pixels from all sub-shapes (step 22). Step 20 is performed for each sub-shape in the order given by the sorted, sub-shape list. Since the sub-shape list is ordered, and the computation process for pixels of an individual sub-shape yields ordered pixels, the resulting pixel list is consequently ordered as well. Thus, sorting the pixel list is not required. This is of prime importance since the pixel list is generally very long and would require a great deal of computation resources to sort from a randomly arranged pattern. It may happen that two adjacent shapes in the sorted sub-shape list overlap in coordinate space. The pixel list resulting is not completely sorted, but nearly sorted.

Step 22 effects forming a pixel list from the pixels generated in step 20. Since the pixels are generated in a partially pre-sorted arrangement, the pixels are also stored in the array in this same pre-sorted arrangement. The pixel array may also be realized by a portion of memory in the storage medium. The pre-sorted or partially sorted arrangement of the pixels facilitates implementation of the insertion sort process used for sorting the pixels into a final arrangement. The performance of the insertion sort process on partially sorted data is linear in element count. e.g. N. However, the performance of the insertion sort process degrades to $N^2$ for randomly sorted data. The pre-sorted or partially sorted arrangement of the pixels allows for the exploitation of the linear performance of the insertion sort process when sorting pre-sorted or partially sorted data. Thus, there are significant advantages in using the insertion sort process on partially sorted data. Other sorting processes do not exhibit the superior performance characteristics of the insertion sort process. For example, the performance of a "quick sort" process on randomly sorted data is $Nlog_2N$ but degrades to $N^2$ for sorted data.

Step 24 effects sorting the pixel list in two (2) dimensions. This step is optional and whether it is implemented depends upon the particular application. The entire pixel list may be sorted by the value of the X coordinate, but several pixels may share a common value of X, differing in Y coordinate. These pixels are all on the same line.

The sorted pixels are stored in a portion of the storage medium. The sorted pixels are then later loaded into a buffer or temporary memory storage area and then used to form raster lines. Automated machining devices, such as data-driven micro-machining devices, may be controlled or moved according to these raster lines. The raster lines may also be displayed on peripheral devices such as CRT monitors or other display devices. Such monitors or displays may be associated with the data driven micro-machining devices.

The hardware and/or software that employs the raster line data may require that the lines be individually sorted. These lines are generally significantly shorter in terms of pixel count than the entire list. Thus, the sorting algorithm for an individual line is often unimportant.

Often the resolution realized in the application allows for scan line compression. Two lines, wherein X values differ by less than the resolution, are combined together to form a single line requiring less processing by the application.

Thus, the present invention provides method for converting graphics data into raster lines that is significantly less complex and time consuming than conventional conversion methods. Furthermore, the conversion method of the present invention is suitable for use with automated manufacturing equipment such as data-driven micro-machining devices and can be used in a PC environment.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for processing data, comprising the steps of:
   a) providing input data defining shapes in a two-dimensional plane, wherein said shapes are defined by points with a plurality of coordinates on an X-axis and a Y-axis;
   b) decomposing the data defining each shape into two-dimensional vector data, wherein said vectors are defined by points with a plurality of coordinates on an X-axis and a plurality of coordinates on a Y-axis;
   c) sorting said two-dimensional vector data according to a first predetermined order wherein said vectors are defined by points with a plurality of coordinates on an X-axis and a plurality of coordinates on a Y-axis;

d) thereafter determining pixel data for the vector data, the pixel data being in substantially the same order as the sorted vector data; and, e) forming raster lines from the sorted pixel data adaptable to compression such that pixel values less than a predetermined resolution are combined to form a single raster line.

2. The method as set forth in claim 1 further comprising step (e) of sorting the pixel data according to a second predetermined order.

3. The method as set forth in claim 1 wherein the input data further defines operation data that determines operations that are to be performed on the shape data, the method further comprising the step of performing the operations defined by the operation data on the vector data.

4. The method as set forth in claim 1 wherein the shape data defines at least one polygon, the decomposing step comprising decomposing the polygon into vector data defining line segments.

5. The method as set forth in claim 1 wherein the shape data defines at least one circle, the decomposing step comprises decomposing the circle into vector data defining arcs.

6. The method as set forth in claim 1 further including storing the sorted pixel data in a storage medium.

7. The method as set forth in claim 2 further including displaying the raster lines on a display device.

8. A method for processing data, comprising the steps of:

a) providing input data defining shapes in a two-dimensional plane, wherein said shapes are defined by points with a plurality of coordinates on an X-axis and a Y-axis;

b) decomposing the data defining each shape into two dimensional vector data wherein said vectors are defined by points with a plurality of coordinates on an X-axis and a plurality of coordinates on a Y-axis;

c) sorting said two-dimensional vector data according to a first predetermined order according to the defined X-axis coordinates or the defined Y-axis coordinates;

d) thereafter determining pixel data for the vector data, the pixel data being in substantially the same order as the sorted vector data;

e) sorting the pixel data according to a second predetermined order; and f) forming raster lines from the sorted pixel data adaptable to compression such that pixel values less than a predetermined resolution are combined to form a single raster line.

9. A method for processing data, comprising the steps of:

a) providing input data defining shapes in a two-dimensional plane, wherein said shapes are defined by points with a plurality of coordinates on an X-axis and a Y-axis, and operations that are to be performed on the shape data;

b) performing the operations on the shape data;

c) decomposing the data defining each shape into two-dimensional vector data wherein said vectors are defined by points with a plurality of coordinates on an X-axis and a plurality of coordinates on a Y-axis;

d) sorting said two-dimensional vector data according to a first predetermined order according to the defined X-axis coordinates or the defined Y-axis coordinates;

e) thereafter determining pixel data for the vector data, the pixel data being in substantially the same order as the sorted vector data;

f) sorting the pixel data according to a second predetermined order; and g) forming raster lines from the sorted pixel data adaptable to compression such that pixel values less than a predetermined resolution are combined to form a single raster line.

10. A method for processing data, comprising the steps of:

a) providing input data defining shapes in a two-dimensional plane, wherein said shapes are defined by points with a plurality of coordinates on an X-axis and a Y-axis, and operations that are to be performed on the shape data;

b) performing the operations on the shape data;

c) decomposing the data defining each shape into two-dimensional vector data wherein said vectors are defined by points with a plurality of coordinates on an X-axis and a plurality of coordinates on a Y-axis;

d) sorting said two-dimensional vector data according to a first predetermined order according to the defined X-axis coordinates or the defined Y-axis coordinates;

e) thereafter determining pixel data for the vector data, the pixel data being in substantially the same order as the sorted vector data;

f) sorting the pixel data according to a second predetermined order;

g) forming raster lines from the sorted pixel data adaptable to compression such that pixel values less than a predetermined resolution are combined to form a single raster line to effect continuous movement of a machining device; and h) moving said machining device according to the raster lines formed in step (g).

* * * * *